(12) United States Patent
O'Keeffe et al.

(10) Patent No.: US 6,801,950 B1
(45) Date of Patent: Oct. 5, 2004

(54) STACKABLE NETWORK UNIT INCLUDING REGISTER FOR IDENTIFYING TRUNK CONNECTION STATUS OF STACKED UNITS

(75) Inventors: Daniel M O'Keeffe, Ballyhooly (IE); Mark A Hughes, Dublin (IE); Kevin Loughran, Castleblayney (IE); Paul J Moran, Hemel Hempstead (GB)

(73) Assignee: 3Com Corporation, Santa Clara, CA (US)

(*) Notice: Subject to any disclaimer, the term of this patent is extended or adjusted under 35 U.S.C. 154(b) by 724 days.

(21) Appl. No.: 09/668,339

(22) Filed: Sep. 25, 2000

(30) Foreign Application Priority Data

Apr. 26, 2000 (GB) ............................................. 0010032

(51) Int. Cl.⁷ .............................................. G06F 15/173
(52) U.S. Cl. ...................................... 709/238; 370/389
(58) Field of Search ................................ 709/238, 223; 370/389, 392

(56) References Cited

U.S. PATENT DOCUMENTS

| | | | | |
|---|---|---|---|---|
| 5,099,473 A | * | 3/1992 | Gupta et al. ................. 370/434 |
| 5,550,807 A | * | 8/1996 | Kuroshita .................... 370/252 |
| 5,771,227 A | * | 6/1998 | Benayoun et al. ........... 370/235 |
| 5,802,054 A | * | 9/1998 | Bellenger .................... 370/401 |
| 5,825,772 A | * | 10/1998 | Dobbins et al. ............. 370/396 |
| 5,886,989 A | * | 3/1999 | Evans et al. ................. 370/347 |
| 5,892,535 A | * | 4/1999 | Allen et al. .................... 725/36 |
| 5,920,699 A | * | 7/1999 | Bare .......................... 709/225 |
| 5,940,596 A | * | 8/1999 | Rajan et al. ................. 709/242 |
| 6,070,070 A | * | 5/2000 | Ladue .......................... 455/419 |
| 6,078,963 A | * | 6/2000 | Civanlar et al. ............. 709/238 |
| 6,104,696 A | * | 8/2000 | Kadambi et al. ............ 370/218 |
| 6,181,702 B1 | * | 1/2001 | Egbert ......................... 370/401 |
| 6,233,242 B1 | * | 5/2001 | Mayer et al. ................ 370/412 |
| 6,396,841 B1 | * | 5/2002 | Co et al. ...................... 370/401 |
| 6,496,502 B1 | * | 12/2002 | Fite et al. .................... 370/389 |
| 6,501,761 B1 | * | 12/2002 | Pannell et al. ............... 370/403 |
| 6,631,137 B1 | * | 10/2003 | Lorrain et al. ............... 370/401 |
| 6,657,757 B1 | * | 12/2003 | Chang et al. ................ 370/471 |
| 6,665,733 B1 | * | 12/2003 | Witkowski et al. .......... 709/249 |
| 2001/0014094 A1 | * | 8/2001 | Epley .......................... 370/392 |
| 2001/0043589 A1 | * | 11/2001 | Kikinis ........................ 370/352 |
| 2002/0046271 A1 | * | 4/2002 | Huang ......................... 709/223 |
| 2003/0118021 A1 | * | 6/2003 | Donoghue et al. ........... 370/392 |

\* cited by examiner

*Primary Examiner*—Bunjob Jaroenchonwanit
(74) *Attorney, Agent, or Firm*—Nixon & Vanderhye P.C.

(57) ABSTRACT

In a stack of network units each includes a multiplicity of ports for receiving and forwarding addressed data packets and a forwarding engine which in response to address data selects at least one port for the forwarding of a data packet. A cascade connects the units and allows the transmission of a packet placed on said cascade by a unit to all the other units. Each unit is responsive to a packet received from the cascade to forward or discard the received packet according to predetermined forwarding rules. A trunk includes a respective port of each of some but not necessarily all the units. Each unit includes a 'trunk box member' register indicating which of the units has at least one port connected in the trunk. When a first unit in the stack receives, at a port connected neither to the trunk nor the cascade, a packet destined for the trunk, the first unit directs that packet to a port connected to the trunk if the first unit has such a port and otherwise sends that packet to the cascade. When a second unit in the stack, having a port connected to the trunk, receives by way of the cascade from the first unit a packet destined for the trunk, the second unit determines with recourse to the forwarding rules, data identifying the first unit and the respective register whether to forward said packet to the trunk. The invention is particularly intended for use in stack-wide trunks operating according to 'local forwarding' and 'next-in-line' rules and allows units in the stack to be omitted from direct connection to the trunk.

20 Claims, 7 Drawing Sheets

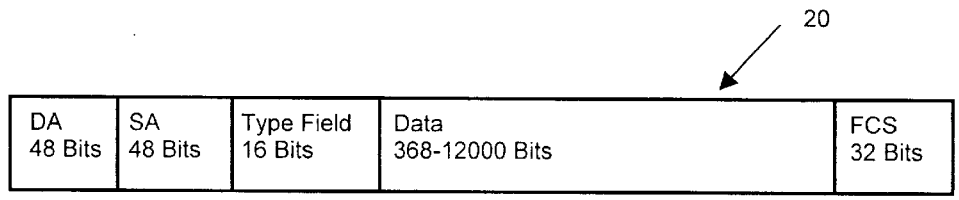
FIG.3A
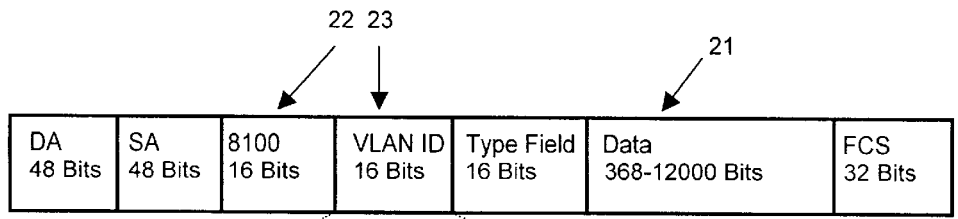
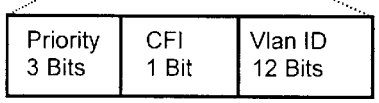
FIG.3B
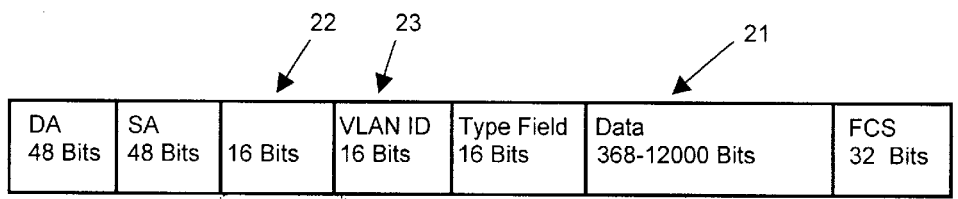
FIG.3C
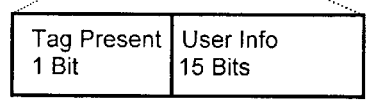
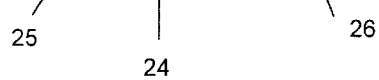

STACKABLE NETWORK UNIT INCLUDING REGISTER FOR IDENTIFYING TRUNK CONNECTION STATUS OF STACKED UNITS

FIELD OF THE INVENTION

This invention relates to data communication systems for conveying information in the form of addressed data packets, such as Ethernet packets, and more particularly relates to the construction and manner of operation of a stackable unit which may be connected to other similar units in a stack. The main object of the invention is to increase the versatility of a stackable unit to enable a greater range of connections of a trunk to a stack of units.

BACKGROUND TO THE INVENTION (a) Stackable Units.

It is well known to provide multi-port network units, such as switches and routers, which can be 'stacked', that is to say connected so that a multiplicity of such units form effectively a single larger unit comprising modules each constituted by one of the stackable units. The term 'stack' arises because frequently, though not necessarily, the units are physically designed so that they may be stacked one above the other. The facility of 'stacking' is very useful in the organisation of networks because it allows for expansion and scaling, though various difficulties are present. Among these is the general inability of a unit in a stack to hold information enabling a determination within that unit of the state or configuration of another unit in the stack. A specific example of such a difficulty will be further explained later. Furthermore, certain forwarding rules need to be obeyed to avoid excessive or unnecessary forwarding of packets or duplicates of packets throughout the stack.

(b) Cascades.

In order to enable the forwarding of packets from one unit in a stack to the other units in a stack, it is common to provide a connection known as a 'cascade'. This comprises a connection between certain ports, at least one for each unit, so as to provide the physical means by which packets which may be received at one unit in a stack can be forwarded prior to ultimate dispatch from the stack by another unit. Cascades may be in comparatively simple form, wherein for example cable connections between specified ports, known as 'cascade ports' connect the units in a stack. Alternatively they may be more sophisticated, including arbitrated access, such as for example described in GB patent publication number 2338155-A. A suitable commercially available cascade is the 'Trillian' cascade made by 3Com Corporation. It is known in stackable switches to provide a 'logical' port which is treated as a destination port by that switch for packets which have to be transmitted via the cascade to another unit. The concept of a logical port is useful when a unit has more than one port connected to the cascade, in such a case a packet which is directed to the 'logical' cascade port is subject to some further logic process in order to determine the physical port from which it should be forwarded onto the cascade.

In general, a cascade is, in respect of packets, merely a transmission medium, i.e. it does not determine which particular unit should receive a packet. A packet which has been placed on the cascade will be conveyed by the cascade to all the active units in the stack. Accordingly, the units themselves need information, which may be conveyed with the packet or be stored in a unit when the stack is made and configured, that enables the units to obey predetermined operating rules that indicate whether a particular unit is required to forward a packet that it receives by way of the cascade or to discard that packet. One such rule is a 'Next in Line' rule which is described hereinafter. However, the operation of such a rule needs qualification when, as envisaged herein, a unit which would be designated for forwarding a packet cannot or should not do so.

(c) Trunks.

Another feature in modern network practice is a 'trunk' or 'trunk connection'. Such a connection is useful where the expected traffic from one network unit to another is substantially greater than can be accommodated by a shingle link A trunk is in essence a set of parallel paths from a remote unit (which may itself be constituted by a stack of units) to a multiplicity of ports. In its simplest form, a trunk connection is made to a multiplicity of ports on a single unit, so that the total bandwidth available for the trunk is generally the aggregate of the bandwidths available to each of the ports which are 'members' of the trunk connection.

However, with the development of stackable units it is also desirable (and known practice) to make ports of different units within a stack members of the trunk. This presents some difficulties of organisation. These need not be severe in respect of packets which enter the stack from the trunk because a switch which receives a packet intended for a destination to which that unit is not coupled by way of one of its local ports broadly need only forward such a packet on the cascade so that that packet eventually reaches a unit having a port connected to the required destination. However, the difficulties can be severe in respect of packets which may be received by any of the units (by way of a non-trunk port) and are intended for forwarding by way of the trunk. Normal forwarding rules which govern the forwarding engine of a stacked unit are difficult to reconcile with the operation of a trunk connected to different units of a stack, or place undue restriction on the manner in which the trunk may be connected to the stack.

More particularly, it is possible to make the software control process, or the corresponding hardware, which directs packets within the unit, subject to a 'local forwarding' rule. According to such a rule, all traffic (i.e. packets and frames) intended for dispatch on a stack-wide trunk must be sent to the trunk from the unit by which the traffic has been received. In other words, any traffic intended for a stack-wide trunk operated in local forwarding mode may not be sent to the trunk by way of the cascade. If the unit which receives a packet has a port which is a 'member' of the trunk, then that packet must be sent by way of that port (or one of the trunk ports for that unit if there is more than one such trunk port). A 'local forwarding' rule is generally useful and convenient, but has hitherto imposed some restriction on the connections that may be made to the units in a stack. In particular, one restriction has been that all units which are capable of sending traffic onto the cascade, normally all the units in the stack, must have at least one port which is a member of the trunk.

An additional difficulty arises in relation to packets which are not only forwarded from a local port but are sent to other units, as in the cases of for example broadcast packets, multicast packets, unicast packets with addresses unknown in an originating unit or packets destined for more than one trunk neither of which is in an originating unit. It is necessary to determine when such a packet is received by way of the cascade from the originating unit whether it has been forwarded to a specific trunk so as to prevent a second forwarding of the packet to the same trunk.

SUMMARY OF THE INVENTION

The main object of the present invention is to provide a stackable network unit, such as a switch, which can in conjunction with other compatible units be connected selectively to a trunk and operated according to a 'local forwarding' rule modified so that the unit need not have any port which is a member of the trunk. For this purpose the stackable network unit preferably includes means, typically a register, namely some accessible storage device having a multiplicity of storage locations, which identifies those units which have ports connected to the trunk. Such a register may be accessed at an appropriate time by the forwarding engine to enable a unit which receives a packet to modify a 'local forwarding' rule and to enable a mode of working in which units connected in a stack need not all have a port connected to the trunk. The register facilitates a determination whether a received packet was placed on the cascade by a unit which has a port which is a member of the trunk. That may be determined by a comparison between the identity of the unit that sent the packet onto the cascade and the contents of the register. If the originating unit has a port connected to the trunk, it may be presumed that the originating unit sends the packet to the trunk and accordingly the unit which receives the packet from the cascade must prevent the packet from going to the trunk. If the register indicates that the originating unit has no port connected to the trunk, the receiving unit may forward the packet to the trunk or to the cascade.

There may be a plurality of such registers in a unit to enable a stack to accommodate a corresponding plurality of different trunks. A given unit may be a member of some trunks but not others.

There is a variety of techniques which may be employed for identifying the unit which originates a packet as far as the stack is concerned. Some cascade architectures enable the identity of an originating unit and/or its MAC address to be conveyed by way of tile cascade. A technique which does not depend on any particular functionality of the cascade is described hereinafter.

A forwarding engine may be subject to further rules, an example of which will be described later, to enable a unit to determine, when it receives by way of the cascade a packet intended for the trunk, whether it should forward the packet to the trunk or send the packet out again on the cascade.

The present invention may be employed in conjunction with means for storing identifications of the ports of a unit connected to the trunk e.g. a 'trunk port register' which is described (among other things) in co-pending application of O'Keeffe et al, Ser. No. 09/562,131 filed May 1, 2000 and assigned to the same assignee as the present application. Although the preferred embodiment described in that application selects the unit which is to forward a packet to the trunk in a manner different from the preferred form of the present invention the present invention may, after a determination of which unit should forward a packet to the trunk, use address hashing as described in the earlier application to select a local port from a trunk port register. Moreover, different trunks connected to the same stack may need to operate according to different forwarding rules and for that purpose a unit may have registers for the modes of working described in both the earlier co-pending application and the present application.

Further features of the invention will be apparent from the following description and drawings.

BRIEF DESCRIPTION OF THE DRAWINGS

FIG. 3 illustrates one manner of modifying a packet to convey information relating to a unit to other units in a stack

DESCRIPTION OF A EXEMPLARY EMBODIMENT

Figure 1:
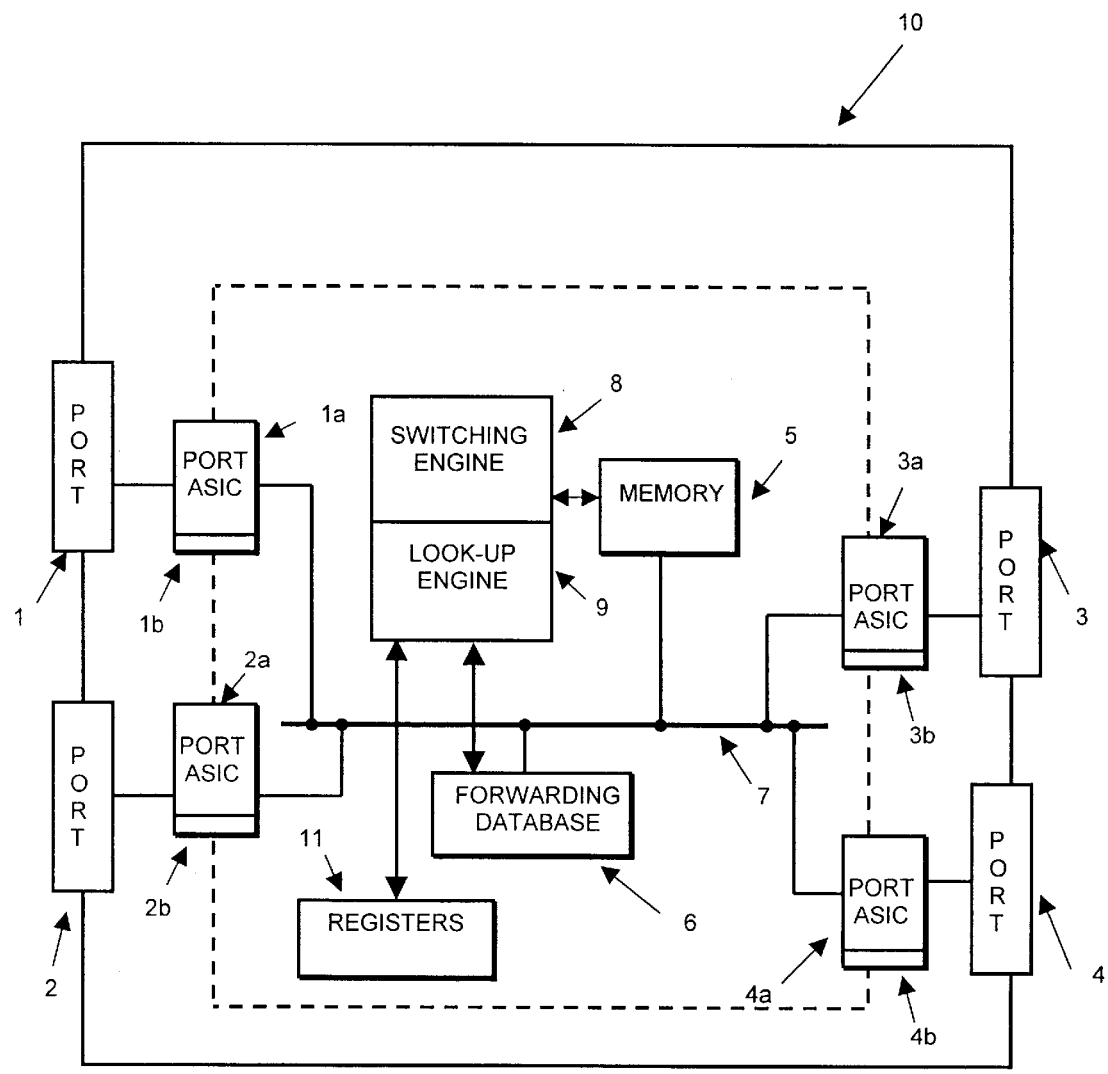
FIG. 1 is an illustration in general schematic form of a switch unit according to the invention.

FIG. 1 illustrates by way of example and in schematic terms a switch 10 which may constitute a stackable unit according to the invention.

Customarily network switches have a substantial multiplicity of ports, typically twenty-eight or more, but in the present example the switch 10 is shown as having four ports 1, 2, 3 and 4. Each of the ports is associated with a respective physical layer device (PHY) and media access control device (MAC) conforming to the required operation standard and is coupled to a respective port ASIC (1a to 4a respectively) which performs such known operations as temporary buffer storage, encapsulation etc and includes registers (1b. 2b etc). Although the port ASICs are shown separately in the Figure, they may be disposed on a single chip, and are connected by the dotted line to signify this Moreover, although the remaining components of the switches shown in FIG. 1 are shown separately, with the possible exception of some or all of the memory employed those components may likewise form part of a single application specific integrated circuit for the switch.

In this example, packets which are received by way of any of the ports may be stored temporarily in memory 5. The switch includes a forwarding database 6 by means of which address data within a packet may be related to forwarding data (such as port numbers). The switch has a bus system 7 which is shown in simplified form but is intended to represent buses for not only packet data but also the customary control and status data necessary for the operation of the switch.

The switch includes a switching engine 8 which relies on the forwarding information obtained from the database by a look-up engine 9 to direct packets from the memory to a relevant port or ports of the switch. The switching engine and look-up engine are shown contiguous since they may, especially for routers, be principally performed by a software controlled central processor. Collectively they are termed herein a 'forwarding engine'.

As will be explained further in conjunction with later Figures, the switch includes a variety of registers. Some of these are collectively described in FIG. 1 as 'registers' and may be accessed by the forwarding engine. Others of the registers may be located more conveniently for each port, for example in the respective port ASICs.

In this embodiment the unit has the following registers.

(1) a 'TrunkBoxMemberMask' register which identifies, preferably in the format of a bit mask, those units which are in the trunk (i.e. each has at least one port in the trunk) There is one of these registers in each unit for each possible trunk.

(2) a 'TrunkPortMember' register, identifying the ports which are in the trunk. There is one of these registers in each unit for each trunk.

(3) a single bit register 'LocalForwardingEn' which indicates whether a respective trunk is operating in a 'local forwarding' mode. There is one of these registers in each unit for each trunk.

(4) a 'sourceBoxID' register which identifies the unit (i.e. Unit 0, Unit 1 etc). There is one of these for each unit.

(5) a 'source trunkID' register, which identifies the trunk of which a respective port is a member. There is one of these registers for each port in each unit.

Thus the first four of these registers may be in the registers 11 and the fifth may be in each port ASIC.

The trunk identification value ('source trunk ID') is desirable because in practice a stack of units may be connected to more than one trunk. The source trunk ID is used to distinguish between traffic from one trunk and traffic from any other trunk. One reason for doing this is to prevent (as will be explained) traffic arriving at a port from the trunk from being sent back to the trunk via a different port on a unit also connected to the trunk this is an aspect of the customary 'same port discard' rule normally required to prevent looping of packets in a packet-based network. In this example the source trunk ID register will be accessed so as to append to each packet, as described later, a four bit source trunk ID word if the port is part of a trunk. This example allows up to 16 different trunks for a stack.

The 'LocalForwardingEn' register would not be necessary if the stack could only operate in a local forwarding mode. However, other forwarding modes (not directly relevant to the invention) are feasible.

Figure 2:
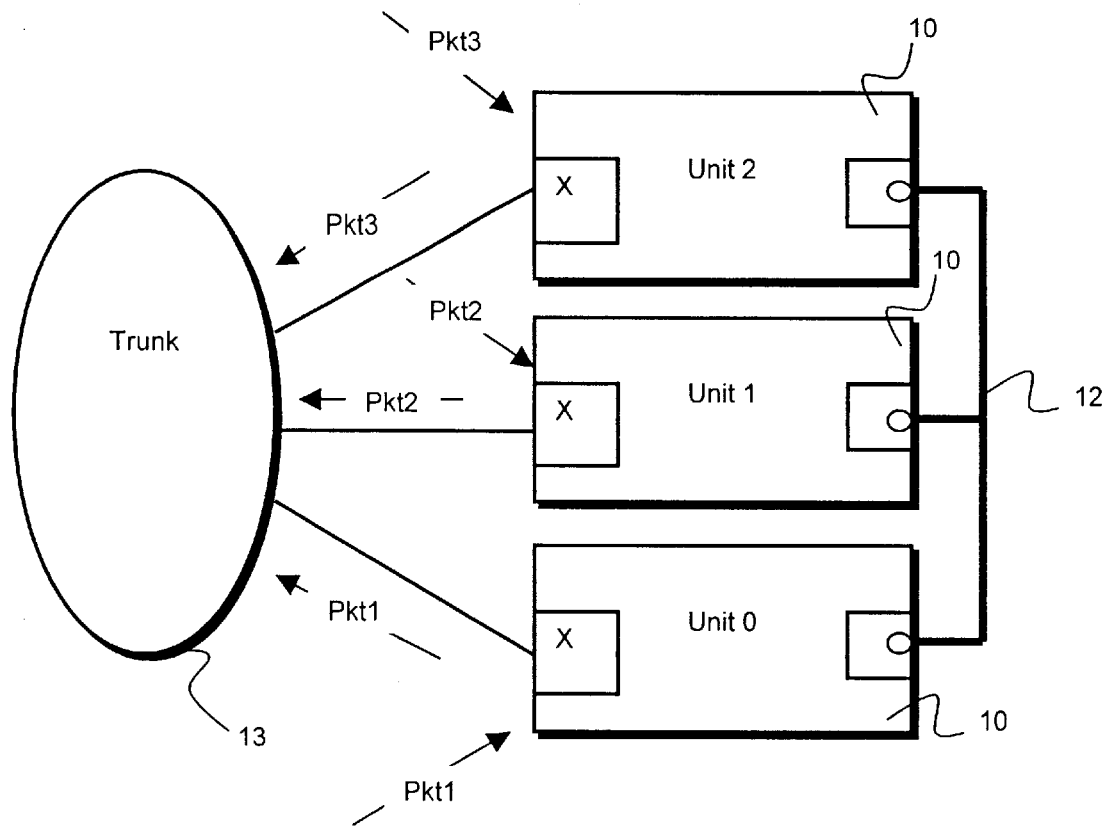
FIG. 2 illustrates a stack of switch units in conjunction with a trunk connection.

FIG. 2 illustrates a simple form of stack with a trunk connection and operating according to a simple 'local forwarding' rule. In this example the stack consists of three units, denoted unit 0, unit 1 and unit 2, all of which may resemble a unit such as unit 10. The units need not be identical, for example one may be a layer 2 switch, another a layer 3 switch and so on but they need to be compatible enough to provide at least a common form of forwarding or switching. The units are enabled to communicate, particularly by passing packets from one to the other, by means of a cascade 12. This is a known form of connection and in a simple form it may comprise cable connections between at least one port (a single port if it be capable of duplex working) on each unit, though various forms of cascade are known.

The source box ID may be a three bit word which can be obtained during passage of the packet through any of the port ASICs of a unit. A second item is the identity of the trunk if the packet is intended for dispatch by the trunk. This item, for example a four bit word is obtained from the trunk register as part of the look-up process. A third item is a 'destination box bit mask', comprising a single bit for each unit in the stack, and indicating (for any packet) which unit or units should receive that packet. This destination box bit mask may vary from packet to packet and is obtained from the associated data during or in consequence of a look-up performed in respect of a packet.

Although there are several ways in which the ancillary information (source box ID, trunk ID and destination bit mask) may accompany a packet on the cascade, one way is to insert the information in place of a VLAN header tag as described later.

FIG. 2 also shows a trunk 13 consisting of a multiplicity of parallel links from a remote unit, or even another stack, to various ports which are distributed among the units in the stack. In this simple example each of the units (each of which has a multiplicity of ports not connected either to the stack or the cascade) has a respective local port (the left hand port denoted X) connected to one of the links which constitutes the trunk.

It will be assumed that in FIG. 2 each of the units has its forwarding engine operating in a 'local forwarding' mode. Although a trunk may or may not be operated in a local forwarding mode, if a particular trunk is in that mode, the forwarding engines of all the units in the trunk must be in that mode. A forwarding engine can respond to address data in a packet and be able to determine that the port is intended for the trunk. A packet (Pkt 1) received by Unit 0 from an ordinary port (i.e. neither a trunk port or a cascade port) and intended for the trunk must according to the 'local forwarding' rule, be forwarded on the trunk port (X) local to Unit 0 Likewise packets such as Pkt2 and Pkt3 received by Unit 1 and Unit 2 respectively must if they are destined for the trunk be fed out on the respective local port (X)

As previously indicated, this imposes restrictions on the usefulness of a trunk in conjunction with a stack of units. For example, it may be that one of the units has a much faster operating speed than the others and that it would be desirable to connect more ports of this unit to the trunk even if some units in the stack were omitted from the trunk.

The look-up process yields from the 'Associated Data' a destination trunk ID. If a particular packet is destined for multiple trunks there will be multiple destination ID codes These codes are used internally in each unit and do not accompany the packet up the cascade. This ID may be used in conjunction with a hashing algorithm to determine from which local port of a trunk a packet should egress. It may be mentioned at the present stage that when a packet is received by way of the cascade and subjected to a look-up in another unit the code or codes will be regenerated, and therefore do not need to accompany the packet up the cascade.

As mentioned previously, it is desirable in the preferred form of the invention to provide for the conveyance with a pack around the stack of certain ancillary information. In particular, the scheme described in the prior co-pending applications Ser. No. 9824594.7 filed Nov. 11$^{th,}$ 1998 and 9921208.6 filed Sep. 9$^{th,}$ 1999 may be used if (as is preferred) the packet is an Ethernet packet FIGS. 3 and 4 of the drawings illustrates the application of the scheme in the context of the present invention.

FIG. 3 of the drawings and particularly FIG. 3A illustrates the basic format 20 for all Ethernet packets. Ignoring certain start of frame and end of frame fields, the packet typically comprises, as it enters a unit, a destination MAC address, conventionally composed of a 48-bit word, a source MAC address, likewise conventionally composed of a 48-bit word, a type field (16 bits), protocol and message data, which in general may comprise from 368 to 12000 bits, and a frame check sum (32 bits). It is customary to call a packet which does not include message data a 'frame' but for convenience the term 'packet' is used generically herein. The address data for 'broadcast' or 'multicast' packets defines a multiplicity of destinations but the packets are still in the same general format.

It is customary to tag a packet to include an identification of the virtual local area network relevant to the packet. As is well known from many publications, it is customary to partition artificially a physical local area network into a multiplicity of virtual local area networks so that, for example, if it is necessary to broadcast a packet, it may be broadcast only to the devices which are defined to be within a respective virtual local area network. The division of a local area network into a multiplicity of virtual local area networks need not be exclusive, thus different virtual local area networks may overlap.

If as shown in FIG. 3B a packet 21 is tagged with VLAN identification, it customarily has a 'VLAN tag header' field 22, known as the 8100 field, which indicates that the VLAN tag is present. In particular, this enables interpretation of the next group 23 of 16 bits after the VLAN tag identifier as containing the VLAN information. The VLAN identification field 23 normally comprises a 3-bit priority field, a 1 bit CFI field and a 12-bit identification field. The next following 16 bits hold the original type field information. The means for flagging that a VLAN tag is present is the 8100 type field. If any other value in a normal system is present in the type field the VLAN data would be taken as the first part of the packet data.

It may be appreciated that if a packet enters a stack, e.g. at port 3 in FIG. 1, there is no need for a VLAN tag header while the packet remains within the stack. Thus, the VLAN tag header may be replaced with some selected information by the time it leaves a port coupled to the cascade which forms the link between the units in the stack.

FIG. 3C illustrates a tagged packet in which the VLAN tag identifier field 22 has been removed and a field of the same length (16 bits) has been inserted. This conveniently comprises a 1-bit field 25 indicating whether the tag 23 is present or not and a 15-bit tag field 26. The 1-bit field represents a compression of the VLAN tag header field. In the modified packet, the 8500 field after the source address is redundant because the presence of the VLAN tag identifier can be inferred.

When the packet is transmitted out of a port not connected to another unit in the stack the fields 25 and tag 26 can readily be removed in favour of the standard VLAN tag identifier (8100) and then the packet will be in the same format as it was when it initially entered the stack.

In the present example, the modified tag field may use 8 bits for the destination box bit mask, 3 bits for the source box ID and four bits for the source trunk ID.

Figure 4:
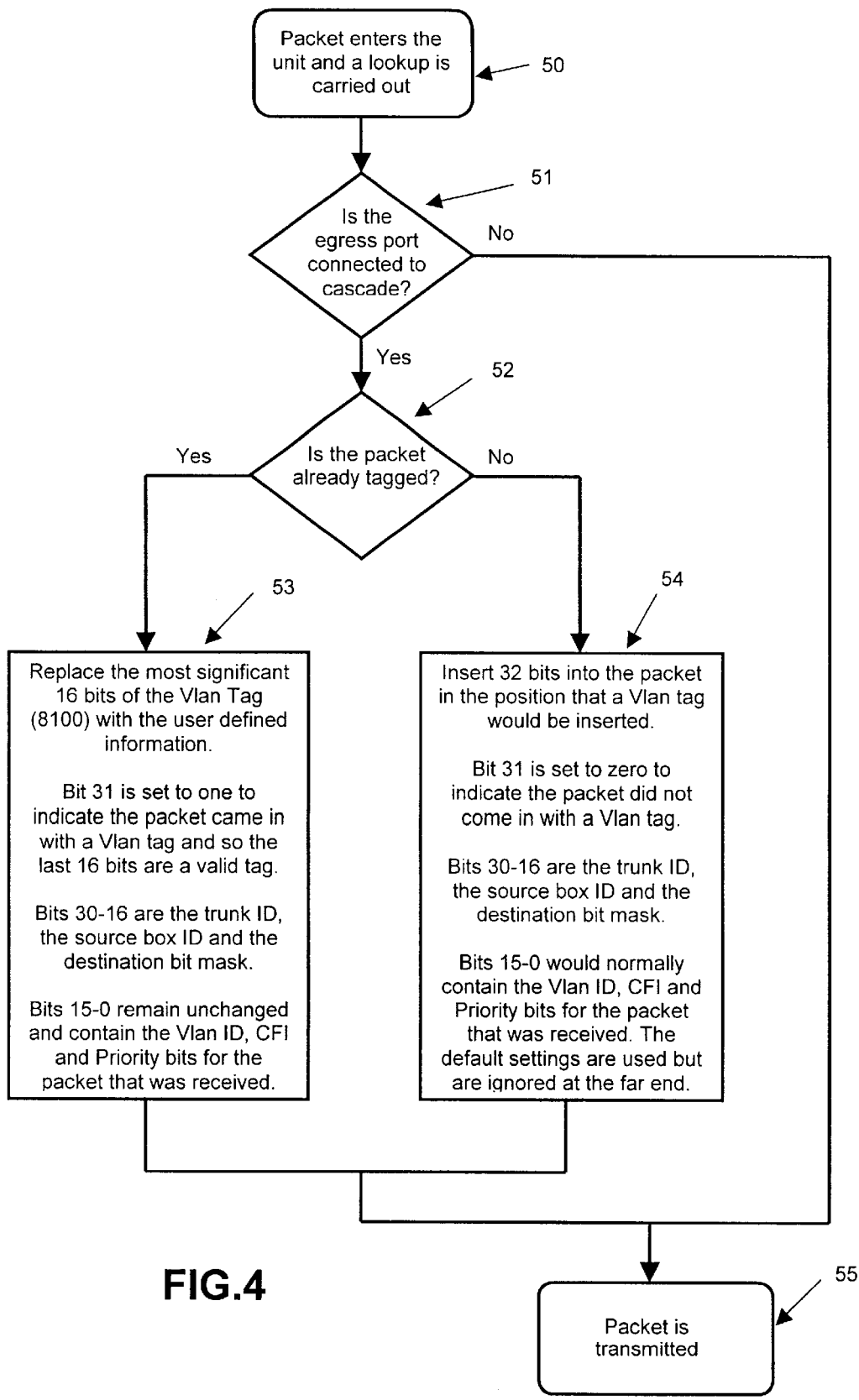
FIG. 4 is a flow diagram illustrating one method of modifying a packet according to FIG. 3.

FIG. 4 illustrates the process of modifying the tag header field. Stage 50 indicates entry of a packet into a unit, for example by any of the ports. Stage 51 will be performed after a look-up determines whether the packet is intended for dispatch on the cascade. If it is not modification of tagging cannot apply and accordingly the packet is transmitted, as shown by stage 55. If the packet is to leave the unit by the cascade, then further examination (stage 52) needs to be made to indicate whether the packet is already tagged. If the packet is not already tagged, 32 bits must be inserted into the packet in the position where a VLAN tag would be inserted. The first bit, i.e. bit 31, will be set to 0 to indicate the packet did not come in with a VLAN tag and so the last 16 bits inserted will be dummy bits in the position which would be occupied by a VLAN tag 33. Bits 30 to 16 are the bits that are used to pass information across the link. Bits 15 to 0 would normally contain the VLAN identification, CFI and priority bits for the packets that were received.

If the packet is already tagged, then the most significant 16 bits of the VLAN tag will be replaced. Bit 31 (shown at 42) will be set to unity to indicate that the packet came in with a VLAN tag and so that the last 16 bits (44) represent a valid tag. Bits 30 to 16 of the user defined bits are used to pass information on the originating unit across the link. Bits 15 to 0 remain unchanged and as before contain the VLAN identification, CFI and priority bits for the packet that was received.

The rectification of the packet as it leaves the stack requires only the replacement of the modified tag header field with the standard VLAN header tar (8100).

Figure 5:
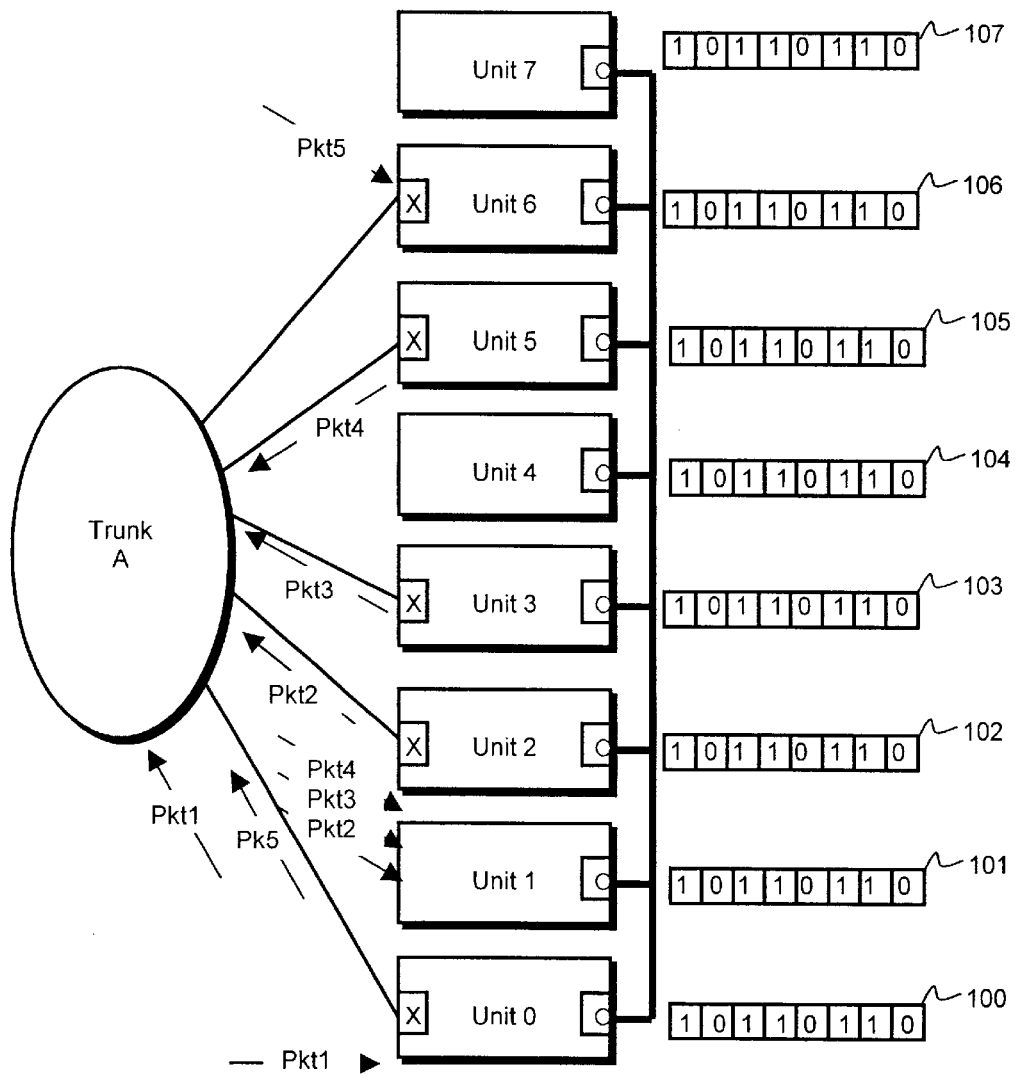
FIG. 5 illustrates a stack of switch units and registers disposed in a configuration enabled by the invention.

FIG. 5 illustrates a modified stack in which several units are not 'members' of the trunk, that is to say those units do not have at least one port which is part of the trunk. In order to enable a trunk to be operated in this manner, each of the units has a stored indication of which units have at least one port which is a member of the trunk. Each unit has for this purpose a respective one of the 'trunk box member' registers shown diagrammatically at 100 to 107 in FIG. 5. In the example to be described, Units 0, Unit 2, Unit 3, Unit 5 and Unit 6 all have at least one respective port forming part of the trunk A whereas the other units do not Thus each of the trunk box member registers is configured to contain an identification in this case the setting of a respective bit of the units which have ports in the trunk.

Also, although in this example there is only one trunk, each unit needs to identify the units which are members of each trunk. Therefore for a stackable unit which can accommodate up to 16 trunks there needs to be a corresponding multiplicity of trunk box member registers in each unit. The relevant register can be accessed by means of the trunk ID.

The forwarding of the various packets shown in FIG. 5 will be explained after the various forwarding rules with reference to FIGS. 6 and 7. It should be understood that there are two aspects to the problem One is to provide that a packet destined for a trunk which is received by a non-trunk, non-cascade port of a unit (the 'originating unit') is forwarded to the cascade when the originating unit has no port in the trunk. The other is to deal with packets that are forwarded to the respective trunk locally by the originating unit but, for a variety of reasons, are received by the cascade from the originating unit and must be prevented from reaching the respective trunk again. This applies in general to packets other than unicast packets with addresses known to the originating unit and accordingly may apply to multicast packets, broadcast packets and unicast packets with addresses unknown to the originating unit (and requiring flooding to all ports in the stack).

The forwarding engine in conjunction with the forwarding database will respond to address data in an incoming packet to select not only the port or ports from which the unit will forward the packet but also to set the destination box bit mask specifying the (other) units to which the packet should be sent by way of the cascade.

Figure 6:
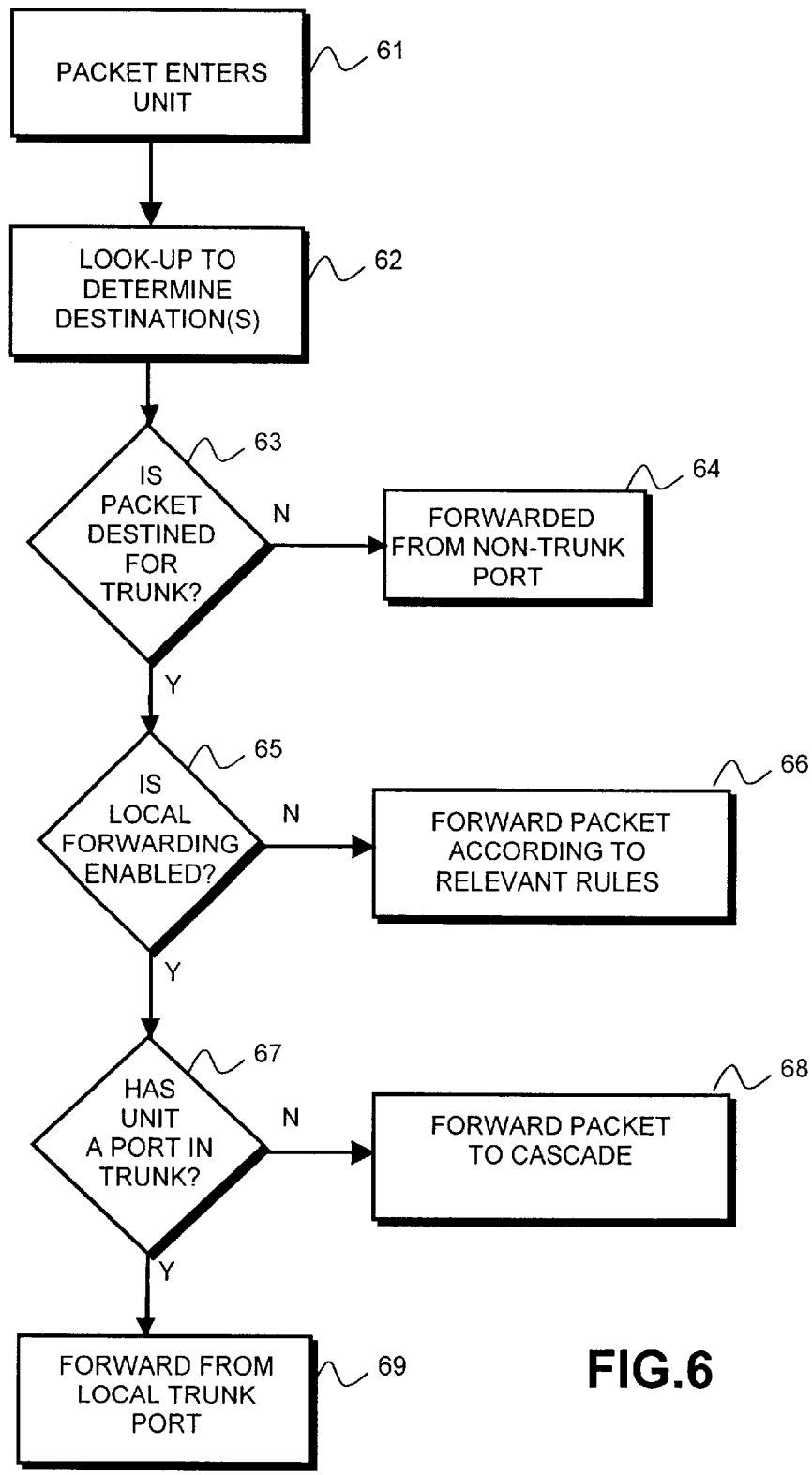
FIG. 6 is a flow diagram of the actions of the forwarding engine in an originating unit.
Figure 7:
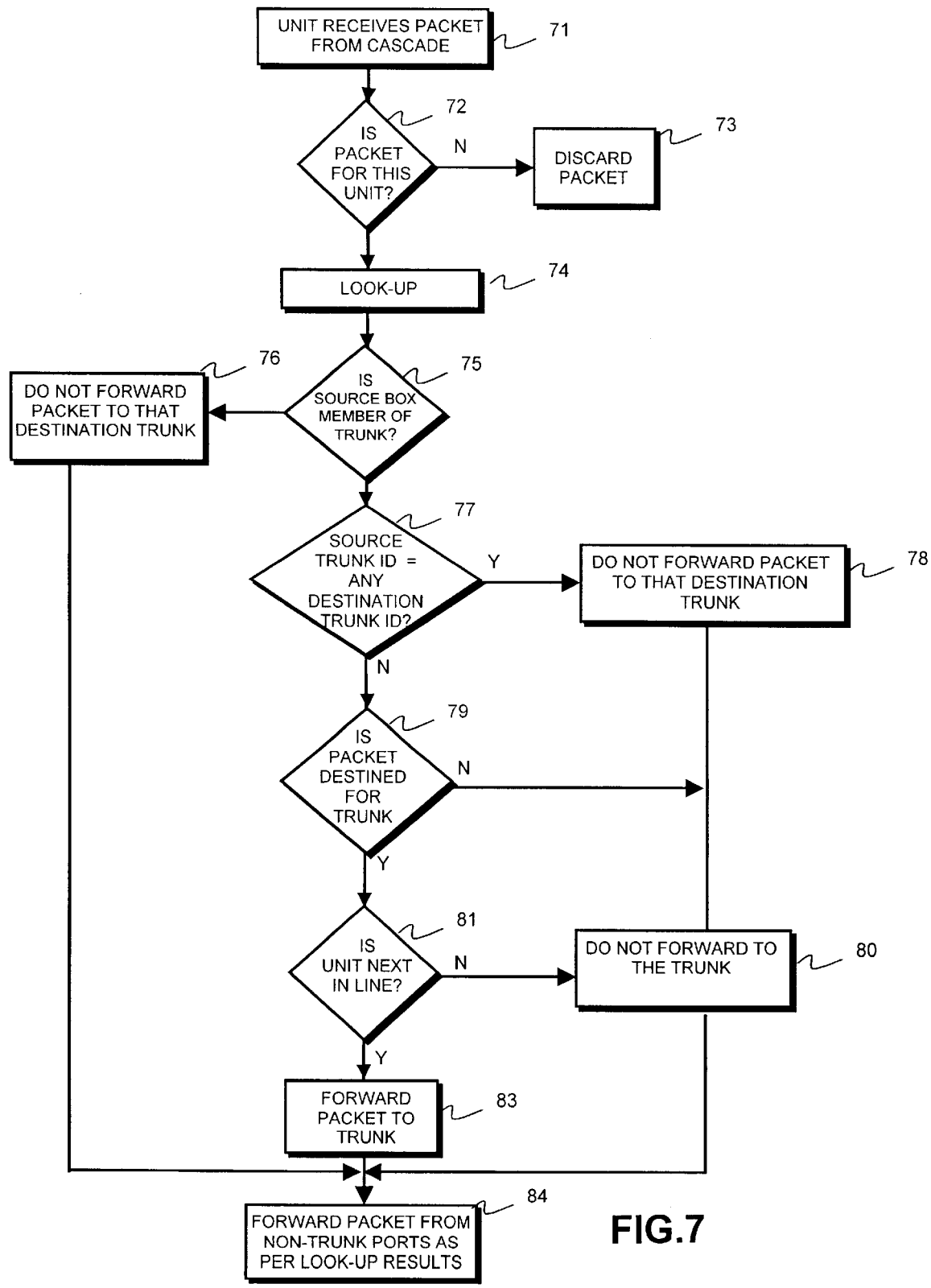
FIG. 7 is a flow diagram of the actions of a forwarding engine in a unit which receives a packet from an originating unit by way of the cascade.

FIGS. 6 and 7 illustrate the operation of the forwarding engine in conjunction with the various registers when the unit is acting within the stack as an originating unit and a receiving unit respectively. It is presumed in the following that each of the units has a trunk box member mask register for a specified trunk and the units operate according to 'local forwarding' and 'next in line' rules for that trunk. FIG. 7, in particular, includes reference to other trunks which may or may not be operating similarly.

As is shown by FIG. 6, when a unit receives a packet (stage 61) it needs to determine the destination (stage 62). The unit performs a look-up (in known manner) in the unit's database, which relates address data to a forwarding data (such as port numbers) and associated so as to determine which port (or ports) are to be selected for the forwarding of the packet. Included in the associated data is an identification of the trunk (the destination trunk ID) with a given destination if that destination requires forwarding of the packet by way of the trunk. The forwarding engine will also have recourse to the trunk port register.

If the packet is not destined for the trunk (stage 63) it will be forwarded from a non-trunk port (stage 64) which may be a local port or may be a cascade port. If the local forwarding mode is not enabled (stage 65) then the packet will be forwarded (stage 66) according to the relevant rules. Operation in a non-local forwarding mode is not relevant to the present invention. If the unit has no port in the trunk (and the packet is destined for the trunk) then the packet must be placed on the cascade (stage 68). If the unit has a port in the trunk (stage 67) the packet will be forwarded from a local trunk port. As previously mentioned, if the unit has more than one port in the trunk, hashing may be employed to determine the egress port.

For every packet forwarded up the cascade by a unit there will be transmitted (by the mechanism illustrated in FIGS. 3 and 4) the destination box bit mask identifying the units by which the packet may be forwarded, the identity of the originating unit (the source box ID) and, if applicable, the identity of the source trunk (the source trunk ID).

One aspect of the invention lies in a modification of the ordinary 'Next in Line' rules to take into account (i) that a packet may have already been forwarded to the trunk by an originating unit and (ii) a packet intended for the trunk will be discarded by a unit which would be selected according to the 'Next in Line' rules but has no port connected to the trunk.

It is convenient now to set out the 'Next in Line' rules by which a unit that receives a packet determines whether it must forward the packet or discard it. They are, (a) The unit must receive the packet.

(b) The packet must be destined for a stack-wide trunk (operating in local forwarding mode). This may be determined from the a lookup—the associated data will contain a destination trunk ID if the packet is destined for a trunk.

(c) The unit is a member of the trunk. This may be determined by accessing the relevant trunk box member register from the destination trunk ID.

(d) The originating unit is not a member of the same trunk. This is determined from an absence of the source box ID sent with the packet in the respective trunk box member register. If the originating member is a member of the same trunk then it may be presumed that the packet (which may be a broadcast packet) has already been sent to the trunk by the originating unit.

(e) The unit ID of the (current) unit is greater than the value of the unit ID of the originating unit. Modular arithmetic is employed: e.g. in FIG. 7, Unit 0 has a greater ID value than Unit 7.

(f) There is no unit ID of a unit that is a member of the trunk whose value is between the unit IDs of the current unit and the originating unit.

FIG. 7 summaries the operation of a unit which receives by way of the cascade a packet destined for a trunk operated according to local forwarding rules. Stage 71 is the reception of the packet. Stage 72 determines whether the packet is intended for this unit according to the destination bit mask and stage 73 shows the discard of the packet if the packet is not so intended. Stage 74 is the look-up which is performed in known manner to obtain forwarding data (such as port numbers). Stage 75 is the determination using the source box ID and the trunk box member register whether the originating (source) unit is a member of the trunk (i.e. has a port in the trunk). If not, the packet will not be forwarded to that (destination) trunk (stage 76). Stage 77 is a comparison to determine whether the sourcetrunkID (obtained from the packet) corresponds to any destination trunk ID (obtained from the look-up 74). If so, the packet will not be forwarded to that destination trunk (stage 78). Stage 79 is a determination whether a port has a destination trunk ID. If not, the packet is not forwarded to the trunk from that port (stage 81). If the packet is intended for the destination trunk there is a determination (stage 81) whether the unit is next-in-line, by reference to the rules given above. Thus the packet will not be forwarded to the trunk (stage 80) if the unit is not next-in-line and forwarded to the trunk (stage 83) if the unit is 'next-in-line'. In any event the packet will be forwarded from any non-trunk port for which it may be intended (stage 84).

Once again, hashing may be used at stage 83 to select the particular egress port if the unit has more than one port in the trunk.

It is now feasible to revisit FIG. 5, which shows various packets (Pkt 1 to Pkt 5) each of which is received by an ordinary (non-trunk) port of one or other of the units and includes the trunk A as a destination. The forwarding of packets not intended for the trunk is omitted from FIG. 5 (and much of the foregoing description) since it is not directly relevant to the invention. It may be mentioned that again for the sake of simplicity each unit connected to the trunk A is so connected by only one port. If there is more than one port, then a hashing may be performed as described in the earlier application to select between the unit's trunk ports. The packet 'Pkt 1' in FIG. 5 is received by unit 0 and after the look-up is destined for the trunk A. Accordingly it is forwarded from Unit 0 to the trunk by the local forwarding rule.

The packet 'Pkt 2' is received by Unit 1 and determined to be destined for the trunk. Since this unit has no port connected to the trunk, the packet is placed on the cascade. The 'Next in Line' rule prescribes Unit 3 as that required for forwarding the packet onto the cascade.

The packet 'Pkt 3' is likewise received by Unit 1 In this case it is assumed that the packet has a destination bit-mask which omits Unit 2 as a destination. In this case the packet will be forwarded to the trunk from Unit 3. The packet 'Pkt 4' is likewise received by Unit 1 and is destined for the trunk. However it is assumed for the sake of example that this packet has a destination bit-mask which specifies all units except Units 2 and 3. Such a packet would normally be forwarded by Unit 4 by the Next in Line rule but since this unit is excluded, the packet is forwarded from Unit 5. Finally, the packet 'Pkt 5' is received by Unit 6. Since Unit 7 is not connected to the trunk, the modified 'Next in Line' rule prescribes Unit 0 for forwarding the packet to the trunk.

What is claimed is:

1. A network unit having a multiplicity of ports for the reception and forwarding of data packets and a forwarding engine which responds to address data in the packets to determine which of said ports are selected for forwarding the packets, said network unit being connectable by way of a cascade with at least one other unit to form a stack of units, wherein, for controlling the forwarding of packets by said network unit when at least some of the units in the stack have at least one respective port in a trunk and at least one unit in the stack has no port in said trunk:

(i) said network unit includes a register for indicating which of all the units in the stack have at least one respective port in said trunk;

(ii) said forwarding engine, in response to a packet which includes the destination of said trunk, forwards this packet directly to said trunk by way of a port of said network unit when said network unit has at least one port in said trunk and forwards this packet to said cascade with an identification of said network unit when the network unit has no port in said trunk; and (iii) said network unit, in response to a packet received by the unit from the cascade and destined for said trunk, determines with recourse to said register and said identification whether that packet has originated in the stack from a unit which has at least one port in said trunk and if so discards that packet.

2. A network unit as in claim 1 and including means for sending with packets on the cascade information identifying those units in the stack which have ports in said trunk.

3. A network unit as in claim 2 wherein said means for sending inserts said information and said identification in said packets on the cascade.

4. A network unit as in claim 1 wherein said unit has a plurality of register, each for indicating the units which are members of a respective trunk.

5. A stack of network units, each including a multiplicity of ports for receiving and forwarding addressed data packets and each including a forwarding engine which in response to address data selects at least one port for the forwarding of said data packet; a cascade connecting said units and allowing the transmission of a packet placed on said cascade by a unit to all the other units, each unit being responsive to a packet received from the cascade to forward or discard the received packet according to predetermined local forwarding rules; wherein:

each unit includes at least one register indicating all those units which have at least one port connected in a respective trunk;

when a first unit in said stack receives at a port connected neither to said respective trunk nor the cascade a packet destined for said trunk, said first unit directs that packet to a port connected to said respective trunk if said first unit has such a port and otherwise sends that packet to the cascade; and when a second unit in said stack and having a port connected to said respective trunk receives by way of the cascade from said first unit a packet destined for said respective trunk said second unit determines with recourse to said local forwarding rules, data identifying said first unit and the respective register means whether to forward this packet to said respective trunk.

6. A stack of network units as in claim 5, wherein said first unit sends that packet with a destination mask indicating the units, in the stack, having at least one port in said respective trunk and an identification of said respective trunk, and said second unit has recourse to said destination mask and said identification to determine whether to forward said this packet to said respective trunk.

7. A stack of network units as in claim 5 wherein each unit in the stack has a respective second register indicating all those of said units which have at least one port connected to a second trunk.

8. A network unit having a multiplicity of ports for the reception and forwarding of data packets and a forwarding engine which responds to address data in the packets to determine which of said ports are selected for forwarding the packets, said network unit being connectable by way of a cascade with at least one other unit to form a stack of units, wherein, for controlling the forwarding of packets by said network unit when at least some of the units in the stack have at least one respective port in a trunk;

(i) said network unit includes a respective register for indicating which of all the units in the stack have at least one respective port in said trunk;

(ii) said forwarding engine, in response to a packet which includes the destination of said trunk;

(a) forwards said packet to said cascade with an identification of said network unit when the network unit has no port in said trunk;

(b) determines with recourse to said register and said identification whether said packet has originated in the stack from a unit which has at least one port in said trunk and if so discards said packet;

(c) determines whether there is any unit which has a port in the trunk, and intervenes between said network unit and the unit from which said packet has originated and if so discards said packet; and (d) otherwise forwards said packet to said trunk.

9. A network unit as in claim 8 and including means for inserting into packets sent on the cascade information identifying all those units which have ports in said trunk.

10. A stack of network units each including a multiplicity of ports for receiving and forwarding addressed data packets and each including a forwarding engine which in response to address data selects at least one port for the forwarding of said data packet; and a cascade connecting said units and allowing the transmission of a packet placed on said cascade by a unit to all the other units, each unit being responsive to a packet received from the cascade to forward or discard the received packet according to predetermined forwarding rules; wherein:

each unit includes at least one respective register indicating all the units which have at least one port connected in a respective trunk; and said network units are organized so that:

(i) when a first unit in said stack receives at a port connected neither to said respective trunk nor the cascade a packet destined for said trunk, said first unit directs that packet to a port connected to said respective trunk if said first unit has such a port and otherwise sends that packet to the cascade with an identification of said first unit; and (ii) when a second unit in said stack, having a port connected to said respective trunk, receives by way of the cascade from said first unit said packet destined for said respective trunk said second unit:

(a) determines with recourse to said respective register and said identification whether said packet has originated in the stack from a unit which has at least one port in said trunk and if so discards said packet;

(b) determines whether there is any unit which has a port in the trunk and intervenes between said network unit and the unit from which said packet has originated and if so discards said packet; and (c) otherwise forwards said packet to said trunk.

11. A method for control of local message packet forwarding in a network unit having a multiplicity of ports for the reception and forwarding of data packets and a forwarding engine which responds to address data in the packets to determine which of said ports are selected for forwarding the packets, said network unit being connectable by way of a cascade with at least one other unit to form a stack of units, the forwarding of packets by said network unit when at least some of the units in the stack have at least one respective port in a trunk and at least one unit in the stack has no port in said trunk being controlled by a method comprising:

(i) maintaining a register for each unit indicating which of all the units in the stack have at least one respective port in said trunk;

(ii) in response to a packet which includes the destination of said trunk, forwarding this packet directly to said trunk by way of a port of said network unit when said network unit has at least one port in said trunk and forwarding this packet to said cascade with an identification of said network unit when the network unit has no port in said trunk; and (iii) in response to a packet received by the unit from the cascade and destined for said trunk, determining with recourse to said register and said identification whether that packet has originated in the stack from a unit which has at least one port in said trunk and if so discarding that packet.

12. A method as in claim 11 and including sending with packets on the cascade information identifying those units in the stack which have ports in said trunk.

13. A method as in claim 12 including inserting said information and said identification in said packets on the cascade.

14. A method as in claim 11 wherein said maintaining step includes maintaining a plurality of registers indicating the units which are members of a respective trunk.

15. A method for control of local message packet forwarding in a stack of network units, each including a multiplicity of ports for receiving and forwarding addressed data packets and each including a forwarding engine which in response to address data selects at least one port for the forwarding of said data packet; a cascade connecting said units and allowing the transmission of a packet placed on said cascade by a unit to all the other units, each unit being responsive to a packet received from the cascade to forward or discard the received packet according to predetermined local forwarding rules, said method comprising:

maintaining at least one register for each unit indicating all those units which have at least one port connected in a respective trunk;

when a first unit in said stack receives at a port connected neither to said respective trunk nor the cascade a packet destined for said trunk, directing that packet to a port connected to said respective trunk if said first unit has such a port and otherwise sending that packet to the cascade; and when a second unit in said stack and having a port connected to said respective trunk receives by way of the cascade from said first unit a packet destined for said respective trunk determining with recourse to said local forwarding rules, data identifying said first unit and the respective register whether to forward this packet to said respective trunk and determining with recourse to said respective register and said data identifying said first unit whether that packet has originated in the stack from a unit which has at least one port in said respective trunk and if so discarding that packet.

16. A method as in claim 15 including sending from said first unit that packet with a destination mask indicating the units in the stack, having at least one port in said respective trunk and an identification of said respective trunk, and using said destination mask and said identification in said second unit to determine whether to forward said this packet to said respective trunk.

17. A method as in claim 15 wherein said maintaining step includes maintaining at each unit in the stack a respective second register indicating all those of said units which have at least one port connected to a second trunk.

18. A method for control of local message packet forwarding in a network unit having a multiplicity of ports for the reception and forwarding of data packets and a forwarding engine which responds to address data in the packets to determine which of said ports are selected for forwarding the packets, said network unit being connectable by way of a cascade with at least one other unit to form a stack of units, the forwarding of packets by said network unit when at least some of the units in the stack have at least one respective port in a trunk being controlled by a method comprising:

(i) maintaining a respective register for each unit indicating which of all the units in the stack have at least one respective port in said trunk;

(ii) in response to a packet which includes the destination of said trunk;

(a) forwarding said packet to said cascade with an identification of said network unit when the network unit has no port in said trunk;

(b) determining with recourse to said register and said identification whether said packet has originated in the stack from a unit which has at least one port in said trunk and if so discards said packet;

(c) determining whether there is any unit which has a port in the trunk, and intervenes between said network unit and the unit from which said packet has originated and if so discards said packet; and (d) otherwise forwarding said packet to said trunk.

19. A method as in claim 18 and including inserting into packets sent on the cascade information identifying all those units which have ports in said trunk.

20. A method for control of local message packet forwarding in a stack of network units each including a multiplicity of ports for receiving and forwarding addressed data packets and each including a forwarding engine which in response to address data selects at least one port for the forwarding of said data packet; and a cascade connecting said units and allowing the transmission of a packet placed on said cascade by a unit to all the other units, each unit being responsive to a packet received from the cascade to forward or discard the received packet according to predetermined forwarding rules; said method comprising:

maintaining at least one respective register for each unit indicating all the units which have at least one port connected in a respective trunk; and organizing said network units so that:

(i) when a first unit in said stack receives at a port connected neither to said respective trunk nor the cascade a packet destined for said trunk, said first unit directs that packet to a port connected to said respective trunk if said first unit has such a port and otherwise sends that packet to the cascade with an identification of said first unit; and (ii) when a second unit in said stack, having a port connected to said respective trunk, receives by way of the cascade from said first unit said packet destined for said respective trunk said second unit;

(a) determines with recourse to said respective register and said identification whether said packet has originated in the stack from a unit which has at least one port in said trunk and if so discards said packet;

(b) determines whether there is any unit which has a port in the trunk and intervenes between said network unit and the unit from which said packet has originated and if so discards said packet; and (c) otherwise forwards said packet to said trunk.

* * * * *